United States Patent

Schiess et al.

[11] 4,044,464
[45] Aug. 30, 1977

[54] CIRCULAR CUTTING DEVICE

[76] Inventors: Georg Schiess, Predigergasse 7, Zurich, Switzerland, 8001; Jorg Heinzer, Vrenelisgartli 6, Einsiedeln (Kt.Schwyz), Switzerland, 8840

[21] Appl. No.: 708,947

[22] Filed: July 27, 1976

[51] Int. Cl.² .............................................. B26B 5/00
[52] U.S. Cl. ................................... 30/164.9; 30/310; 33/27 C
[58] Field of Search .................. 30/310, 300, 164.9, 30/164.95; 408/113; 33/27 B, 27 C; 408/213

[56] References Cited

U.S. PATENT DOCUMENTS

| 396,600 | 1/1889 | Rowland | 30/310 X |
|---|---|---|---|
| 953,407 | 3/1910 | Braid | 33/27 C |
| 959,311 | 5/1910 | Chase | 33/27 C |
| 1,421,921 | 7/1922 | Doerr | 33/27 C |
| 2,062,157 | 11/1936 | Benshimol | 33/27 C |
| 2,735,486 | 2/1956 | Millard | 30/310 X |

Primary Examiner—Al Lawrence Smith
Assistant Examiner—J. C. Peters
Attorney, Agent, or Firm—Karl F. Ross

[57] ABSTRACT

A circular cutting device having a stand which rests upon the workpiece with its own weight and via an adhesive layer disposed on the bottom of the stand. A sleeve in the stand threadedly receives a hollow pivot shaft in which a centering pin is axially displaceable against the force of a spring. A radial arm carries the tool and is fixed to a bush rotatably guided on the shaft.

6 Claims, 5 Drawing Figures

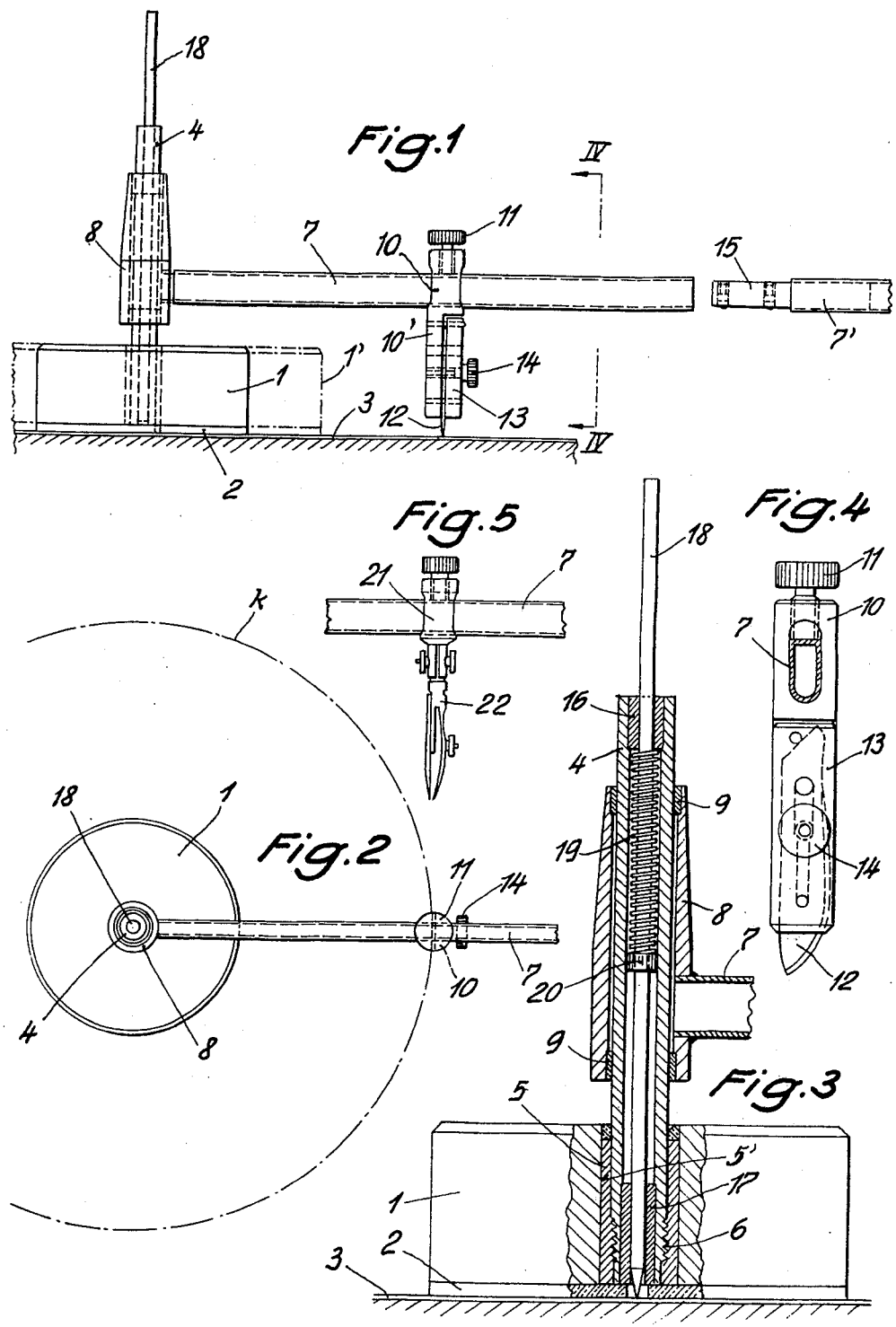

CIRCULAR CUTTING DEVICE

Conventional circular cutting devices include those that are arranged on the revolving spindle of a machine tool, such as a vertical boring machine, and those which can be operated by hand. With the latter, a guide body must be placed on the workpiece to act as the bearing for the swing-arm pivot. To ensure the stability of this guide body it is either screwed into a bearing hole in the work table or it must be provided with pins engaging the workpiece. In the first case only circular discs with a hole in the middle can be made, while in the second case the circular discs sustain damage from the engaging pins. When the circular cutting device is screwed into the work table, the circular disc cut out cannot be removed without first taking the cutting device from the work table.

The present invention relates to a mobile circular cutting device usable on any work table, with an arm rotatable about a central axis carrying the cutting tool, differing from devices of the type known heretofore in that the axis consists of a hollow shaft and is held in a stand plate, which provides the necessary stability for working by means of its own weight and an adhesive coating on its underside resting on the workpiece, the hollow shaft guiding a centering pin displaceably in the axial direction, with a spring tending to hold the centering pin in a position protruding from the stand plate at the bottom.

The accompanying drawing shows by way of example a preferred embodiment of the invention.

In the drawing:

FIG. 1 is an elevational view of the circular cutting device;

FIG. 2 is a top plan view of the device of FIG. 1;

FIG. 3 is an enlarged detail axial section of the device of FIG. 1;

FIG. 4 is an enlarged detailed view of a portion of the device of FIG. 1; and

FIG. 5 shows an accessory which can form part of the device.

Referring to the drawing, the circular cutting device shown includes a stand plate 1 or 1' consisting, say, of ferrous metal, which provides a support on the workpiece adhering friction-tight on account of its own weight and an adhesive coating 2 on its underside. Inserted in a central bore 5' of the stand plate 1 is a sleeve 5. A removable hollow cylindrical bearing shaft 4 is inserted into the sleeve and is joined to it with a screw thread 6. The bearing shaft 4 has a guide sleeve 8 pushed onto it, which is rotatable and axially displaceable and carries a radial arm or beam 7. Plastic sliding bearings 9 are received in the ends of guide sleeve 8. A tool holder 10 slides along the arm 7 and can be locked thereto with a screw 11. The tool holder carries a cutter 12 which is gripped between a fixed leg 10' and a moving clamp plate 13 by means of a clamp screw 14. An extension rod 7' with the same profile as the arm 7 can be fitted into the free end of the arm 7 which has a hollow cross section, by means of the self-locking pin 15. On arm 7 or its extension rod 7' several cutting tool holders 10 or also tool carriers 21 taking ink or pencil drafting attachments 22 may be mounted (FIG. 5). A special stand plate 1' has a greater area and weighs correspondingly more, and is employed for cutting thicker workpieces or when using the extension and 7' with more than one tool holder. Axially displaceable in two sliding guide bushes 16, 17 of the hollow cylindrical bearing shaft 4 is a centering pin 18. A compression spring 19 is braced against a sliding guide plunger 20 of the centering pin 18 at one end and against the upper sliding guide bush 16 at the other end, tending to force the centering pin down and press it onto the predetermined center of the circular disc which is to be cut out.

With the stand plate placed on a workpiece 3 the device is held with one hand on the stand plate or on bearing axis 4, setting the tip of the centering pin 18, which protrudes from the bottom of the stand plate under the action of spring 19, onto the center of the circular disc to be cut out, touching it lightly so that no damage is caused to the workpiece. Bearing shaft 4 is then allowed to slide down along the centering pin 18 under the weight of the stand plate, until the stand plate is resting on the workpiece 3. Centering pin 18 and bearing shaft 4 automatically assume a position perpendicular to the plane of the workpiece 3. The arm 7 is then fitted with the tool 10 - 14 is then fitted over the bearing shaft 4.

At the first revolution of the arm 7 the workpiece 3 can be scribed along the circle k (FIG. 2) by pressing lightly on the tool holder 10. Depending on the material and thickness of the workpiece, more pressure is applied during subsequent revolutions of the tool holder 10 until the workpiece is cut out completely.

For large radiuses the extension rod 7' is used. Depending on the nature of the workpiece and its diameter when cut out, a stand plate of appropriate size and weight is to be employed.

The tool holder 21 shown in FIG. 5 enables a lead or ink drafting attachment 22 to be used, as well as a glass cutter (not shown).

We claim:

1. A circular cutting device with an arm rotatable about a central axis carrying the cutting tool, wherein the axis is defined by a hollow shaft held in a stand plate which provides the necessary stability for working by means of its own weight and an adhesive coating on its underside resting on the workpiece, the hollow shaft guiding a centering pin displaceably in the axial direction, with a spring tending to hold the centering pin in a position protruding from the stand plate at the bottom.

2. The device defined in claim 1 wherein the arm is a hollow profile member and is extended by an extension rod of the same profile, insertable thereinto.

3. Device as defined in claim 1, wherein a cutter on a part of the tool holder is exchangeably gripped by means of a clamping plate with a set screw.

4. Device as defined in claim 1, wherein the hollow shaft is fitted in an axial sleeve of the stand plate and detachably connected to said sleeve by a screw thread.

5. Device as defined in claim 1 wherein the arm has several tool holders radially displaceably and fixably arranged thereon.

6. The device defined in claim 1 wherein as further accessory there is provided a glass cutter exchangeably fitted in the tool holder.

* * * * *